United States Patent [19]

Taniyama et al.

[11] Patent Number: 4,677,871
[45] Date of Patent: Jul. 7, 1987

[54] LUBRICATION MECHANISM IN FINAL DRIVE AND DIFFERENTIAL UNIT

[75] Inventors: Kiyoshi Taniyama; Hiroshi Hori, both of Toyota, Japan

[73] Assignee: Toyota Jidosha Kabushiki Kaisha, Aichi, Japan

[21] Appl. No.: 750,309

[22] Filed: Jul. 1, 1985

[30] Foreign Application Priority Data

Jul. 6, 1984 [JP] Japan .................... 59-102634[U]

[51] Int. Cl.$^4$ .................... F16H 57/04; F01M 1/00
[52] U.S. Cl. .................... 74/467; 74/607; 184/11.1; 184/6.12
[58] Field of Search .................... 184/11.1, 11.4, 11.5, 184/13.1, 6.12; 74/607, 467

[56] References Cited

U.S. PATENT DOCUMENTS

| | | | |
|---|---|---|---|
| 1,760,356 | 5/1930 | Harper | 184/11.1 |
| 2,018,188 | 10/1935 | Padgett et al. | 184/11 |
| 2,240,118 | 4/1941 | Matthews | 184/11.1 |
| 2,368,963 | 2/1945 | Boden | 184/11.1 |
| 2,929,468 | 3/1960 | Steiner | 184/6.12 |
| 4,090,748 | 5/1978 | Sugimoto et al. | 184/11.1 |
| 4,157,045 | 6/1979 | Suzuki | 184/6.12 |
| 4,271,717 | 6/1981 | Millward et al. | 184/11.1 |
| 4,466,508 | 8/1984 | Buse | 184/13.1 |

FOREIGN PATENT DOCUMENTS

| | | |
|---|---|---|
| 1729913 | 7/1956 | Fed. Rep. of Germany . |
| 2417691 | 2/1979 | France . |
| 807832 | 1/1959 | United Kingdom . |
| 1188863 | 4/1970 | United Kingdom . |
| 2007784 | 5/1979 | United Kingdom . |

Primary Examiner—Lawrence Staab
Assistant Examiner—Martin G. Belisario
Attorney, Agent, or Firm—Parkhurst & Oliff

[57] ABSTRACT

A final drive and differential unit for a motor vehicle comprises a differential carrier integrally formed with a cylindrical support structure, a differential gear unit rotatably mounted within the carrier and provided thereon with a ring gear, and a drive pinion shaft supported by a pair of axially spaced outside and inside bearings within the support structure, the pinion shaft extending outwardly through an annular oil seal member mounted within the outer end portion of the support structure and being provided at its inner end with a pinion in mesh with the ring gear. The support structure is formed in one side wall thereof with an oil supply passage for permitting the flow of lubricating oil passing therethrough from the interior of the carrier into an annular space around the pinion shaft between the oil seal member and the outside bearing and is formed in the other side wall thereof with a return passage for permitting the flow of lubricating oil passing therethrough from the annular space into the carrier. The support structure is formed at the inner wall thereof with a recessed portion located above the annular space around the pinion shaft, and an impeller member is mounted on the pinion shaft for rotation therewith to pick up lubricating oil stored in the annular space toward the recessed portion of the support structure.

5 Claims, 4 Drawing Figures

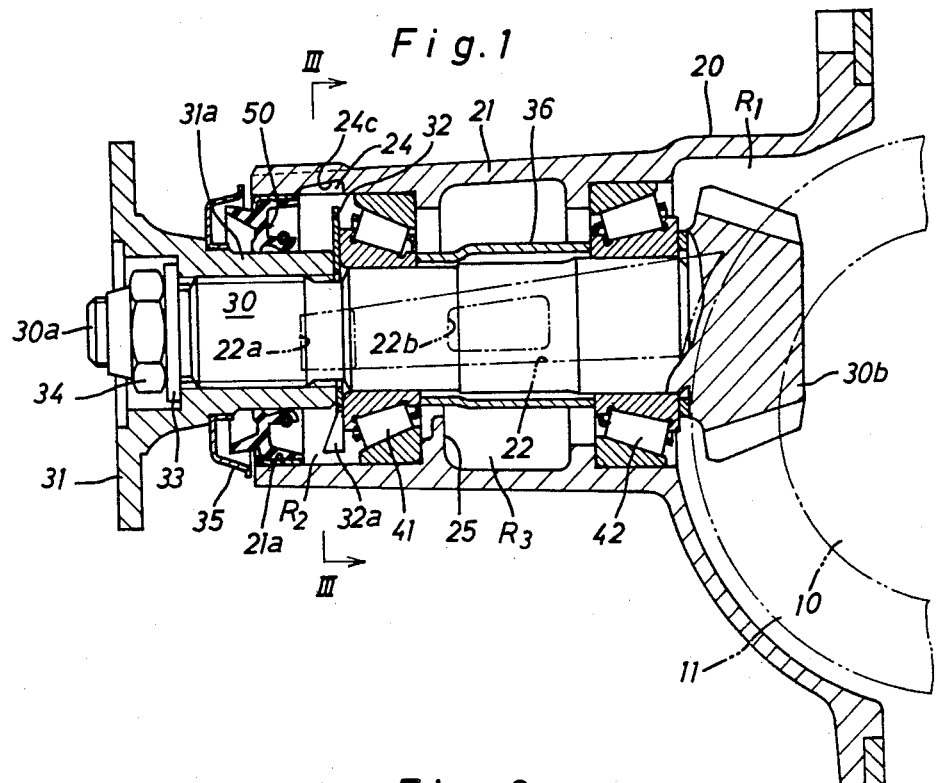
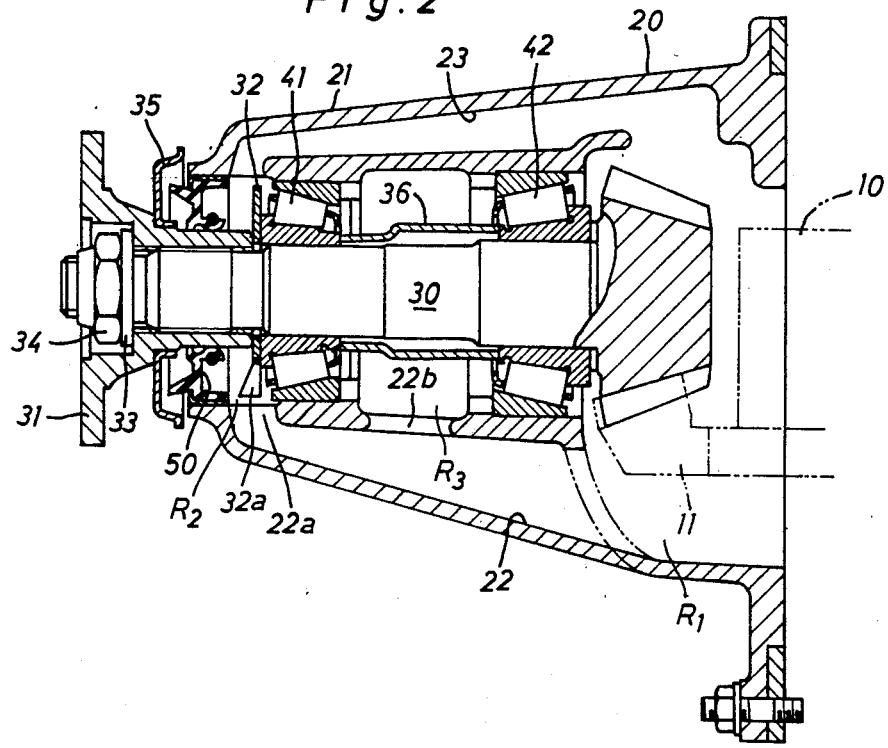

LUBRICATION MECHANISM IN FINAL DRIVE AND DIFFERENTIAL UNIT

BACKGROUND OF THE INVENTION

The present invention relates to a final drive and differential unit for motor vehicles, and more particularly, but not exclusively, to a lubrication mechanism in the final drive and differential unit.

A final drive and differential unit is known of the type which comprises a differential carrier integrally formed with a cylindrical support structure and arranged to store an amount of lubricating oil therein, a differential gear unit rotatably mounted within the carrier, a ring gear contained within the carrier and mounted on the differential gear unit for rotation therewith, a drive pinion shaft supported by a pair of axially spaced bearings mounted within the cylindrical support structure, and in which the drive pinion shaft is integrally provided at the inner end thereof with a drive pinion in mesh with the ring gear and at the outer end thereof with a companion flange the sleeve portion of which is surrounded by an annular oil seal member within the outer end portion of the support structure to close the interior of the support structure in a fluid-tight manner.

In such a final drive and differential unit as described above, the inside bearing facing the interior of the carrier is directly splashed with lubricating oil picked up by rotation of the ring gear, but the outside bearing and the adjacent oil seal member may not be splashed with the picked up lubricating oil. It is, therefore, necessary to provide positive lubrication of the outside bearing and the adjacent oil seal member so as to ensure durability of the final drive and differential unit. In this respect, there has been proposed a lubrication mechanism for the outside bearing and the adjacent oil seal member, wherein an oil supply passage is formed in one side wall of the cylindrical support structure to receive the lubricating oil picked by rotation of the ring gear and to supply it into an annular space around the sleeve portion of the companion flange between the outside bearing and the oil seal member, and wherein an oil return passage is formed in the other side wall of the cylindrical support structure to permit the lubricating oil passing therethrough from the annular space to return into the interior of the differential carrier.

In the above lubrication mechanism, the cylindrical support structure is further integrally formed on the inner wall thereof with a guide portion which extends radially inwardly to store a predetermined amount of the lubricating oil within the bottom portion of the annular space for sufficient lubrication of the outside bearing and the oil seal member. In such an arrangement of the lubrication mechanism, it has been, however, observed that during stopping or low speed travel of the vehicle on an ascending road, the outside bearing allows the flow of lubricating oil passing therethrough from the annular space into the carrier. As a result, the liquid level of the stored lubricating oil in the annular space drops below a predetermined level, resulting in insufficient lubrication of the oil seal member.

SUMMARY OF THE INVENTION

Accordingly, it is a primary object of the present invention to provide an improved lubrication mechanism in the final drive and differential unit, wherein the oil seal member is supplied with a sufficient amount of lubricating oil during low speed rotation of the ring gear in starting operation of the vehicle or in travelling of the vehicle at a low speed on an ascending road.

In a preferred embodiment of the present invention, there is provided a lubrication mechanism for the final drive and differential unit, wherein the cylindrical support structure of the carrier is formed at the inner wall thereof with a recessed portion located above the annular space around the sleeve portion of the companion flange and including an inclined guide surface directed toward the oil seal member, and wherein an impeller member is mounted on the drive pinion shaft for rotation therewith and arranged to pick up lubricating oil stored in the annular space toward the recessed portion of the support structure.

In operation of the final drive and differential unit, the lubricating oil stored in the annular space is picked up by rotation of the impeller member and splashed onto the inner peripheral wall of the cylindrical support structure. A portion of the splashed lubricating oil flows into the recessed portion of the support structure and is guided by the inclined guide surface of the recessed portion to drop onto a sliding portion of the oil seal member. The remaining portion of the splashed lubricating oil is reflected by the inner wall of the support structure and directly splashed onto the sliding portion of the oil seal member. This ensures sufficient lubrication of the oil seal member even when the liquid surface of the stored lubricating oil drops below a predetermined level in starting operation of the vehicle or during low speed travel of the vehicle on an ascending road.

BRIEF DESCRIPTION OF THE DRAWINGS

Additional objects and advantages of the present invention will become more readily apparent from the following detailed description of a preferred embodiment thereof when considered with reference to the attached drawings, in which:

FIG. 1 is a vertical sectional view of a final drive and differential unit in accordance with the present invention;

FIG. 2 is a horizontal sectional view of the final drive and differential unit of FIG. 1;

DETAILED DESCRIPTION OF THE PREFERRED EMBODIMENT

Figure 3:
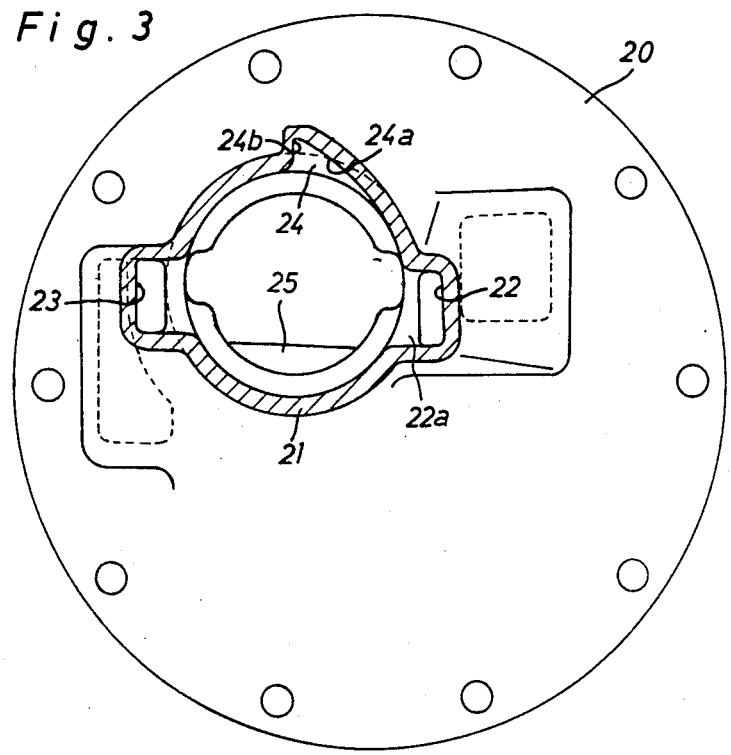
FIG. 3 illustrates a cross-section taken along line III—III in FIG. 1.

Referring now to the drawings, in particular to FIGS. 1 and 2, there is illustrated a final drive and differential unit for a motor vehicle of the front engine, rear wheel drive type. The final drive and differential unit comprises a differential carrier 20 integrally formed with a cylindrical support structure 21 and arranged to be coupled with an axle housing (not shown) in a fluid-tight manner to store an amount of lubricating oil therein, a differential gear unit 10 rotatably mounted within the carrier 20, a ring gear 11 contained within the carrier 20 and mounted on the differential gear unit 10 for rotation therewith, and a drive pinion shaft 30 rotatably supported by a pair of axially spaced tapered roller bearings 41 and 42 mounted within the cylindrical support structure 21 and positioned in place by means of a cylindrical spacer 36. The drive pinion shaft 30 is integrally provided at its inner end with a drive pinion 30b which is located in the interior of carrier 20 and permanently in mesh with the ring gear 11. The drive pinion shaft 30 extends outwardly from the cylindrical support structure 21 of carrier 20.

In the above arrangement, a companion flange 31 is splined to the drive pinion shaft 30 and fixed in place through a screw washer 32 by means of a fastening nut 34 threaded over the outer end 30a of shaft 30 through a washer 33. An annular oil seal member 50 is fixedly mounted within the outer end portion 21a of cylindrical support structure 21 and is in surrounding relationship with a sleeve portion 31a of companion flange 31 to close the interior of cylindrical support structure 21 in a fluid-tight manner. An annular dust deflector 35 is fixed to a neck portion of companion flange 31 to contain therein the outer end of oil seal member 50.

As is illustrated in FIGS. 2 and 3, the cylindrical support structure 21 of carrier 20 is formed in one side wall thereof with an oil supply passage 22 and in the other side wall thereof with an oil return passage 23. The oil supply passage 22 is arranged in parallel with the drive pinion shaft 30 at the same side as the ring gear 11 and opens at its rear end into a first chamber $R_1$ in which the differential gear unit 10 is contained. The oil supply passage 22 opens at its front end into a second chamber $R_2$ in the form of an annular space around the drive pinion shaft 30 between the outside bearing 41 and the oil seal member 50. The oil supply passage 22 further opens at its intermediate portion into a third chamber $R_3$ in the form of an annular space around the drive pinion shaft 30 between the bearings 41 and 42. The cylindrical support structure 21 is formed in the one side wall thereof with a rectangular lateral opening 22a which is arranged to permit the flow of lubricating oil from the oil supply passage 22 into the second chamber $R_2$. The cylindrical support structure 21 is further formed in the one side wall thereof with a rectangular lateral opening 22b which is arranged to permit the flow of lubricating oil from the oil supply passage 22 into the third chamber $R_3$. In the above-described arrangement of the oil supply passage 22, the lowermost edge of lateral opening 22a is positioned below the lowermost edge of lateral opening 22b with a predetermined distance. The oil return passage 23 is arranged in parallel with the drive pinion shaft 30 at the opposite side of the ring gear 11 and opens at its front end into the second chamber $R_2$ and at its rear end into the first chamber $R_1$.

Figure 4:
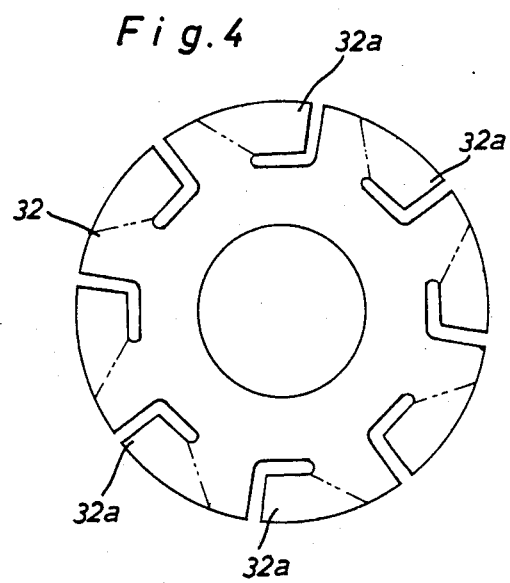
FIG. 4 is a front view of a screw washer illustrated in FIGS. 1 and 2.

To ensure sufficient lubrication of the outside bearing 41 and the annular oil seal member 50, the final drive and differential unit is characterized in that the cylindrical support structure 21 is formed at the inner wall thereof with a recessed portion 24 located above the second chamber $R_2$ and that the screw washer 32 is arranged to pick up the lubricating oil stored in the second chamber $R_2$. As is illustrated in FIGS. 1 and 3, the recessed portion 24 of cylindrical support structure 21 includes a circumferential guide surface 24a formed to induct upward the lubricating oil picked up by the screw washer 32, a vertical guide surface 24b formed along the upper end of the guide surface 24a to receive the lubricating oil guided by surface 24a, and an inclined guide surface 24c directed toward the upper portion of annular oil seal member 50 to transfer the lubricating oil onto the oil seal member 50. The screw washer 32 is interposed between the inner end of companion flange 31 and an inner race of outside bearing 41 to position the companion flange 31 in place on the drive pinion shaft 30 and to rotate therewith. As is illustrated in FIG. 4, the screw washer 32 is integrally formed with a plurality of circumferentially spaced radial blades 32a which are constructed to pick up the stored lubricating oil in the second chamber $R_2$ during counterclockwise rotation of the drive pinion shaft 30. In this embodiment, the cylindrical support structure 21 is further formed on the inner wall thereof with an upright partition 25 which is arranged to constantly store a predetermined amount of lubricating oil in the bottom portion of the second chamber $R_2$.

Assuming that the drive pinion shaft 30 is applied with a drive torque from a prime mover of the vehicle to rotate the ring gear 11, the stored lubricating oil in carrier 20 is picked up by rotation of the ring gear 11 and flows into the oil supply passage 22. When the ring gear 11 is rotated at a low speed, a small amount of lubricating oil is picked up by rotation of the ring gear 11 and flows through the bottom portion of supply passage 22. In such a condition, almost all the lubricating oil in supply passage 22 flows into the second chamber $R_2$ across the lateral opening 22a to effect lubrication of the outside bearing 41 and the oil seal member 50. Meanwhile, the inside bearing 42 is sufficiently lubricated by the lubricating oil directly splashed thereon. When the ring gear 11 is rotated at a high speed, a large amount of lubricating oil is picked up by rotation of the ring gear 11 and flows through the upper portion of supply passage 22. In such a condition, the lubricating oil in supply passage 22 flows into the second and third chambers $R_2$ and $R_3$ respectively across the lateral openings 22a and 22b to effect lubrication of both the tapered roller bearings 41 and 42 and the oil seal member 50. Then, a portion of the lubricating oil passing through the bearing 41 flows into the second chamber $R_2$ and returns into the first chamber $R_1$ through the return passage 23, while the remaining portion of the lubricating oil passing through the bearing 42 directly returns into the first chamber $R_1$. This serves to avoid excessive entry of the lubricating oil into the second chamber $R_2$ and to prevent the oil seal member 50 from leakage of the oil thereacross.

In the operation described above, the lubricating oil stored in the second chamber $R_2$ is picked up by rotation of the screw washer 32 and splashed onto the inner peripheral wall of cylindrical support structure 21. A portion of the splashed lubricating oil flows into the recessed portion 24 of support structure 21 and is guided by the inclined guide surface 24c of recessed portion 24 to drop onto a sliding portion of oil seal member 50. The remaining portion of the splashed lubricating oil is reflected by the inner wall of support structure 21 and directly splashed onto the sliding portion of oil seal member 50. Thus, the oil seal member 50 is sufficiently lubricated even when the lubricating oil is stored only in the bottom portion of the second chamber $R_2$ in starting operation of the vehicle or during low speed travel of the vehicle on an ascending road.

Although a certain specific embodiment of the present invention has been shown and described, it is obvious that many modifications and variations thereof are possible in light of these teachings. For example, the recessed portion 24 in cylindrical support structure 21 may be formed in a different configuration to transfer the splashed lubricating oil onto the oil seal member 50, and the radial blades 32a of screw washer 32 may be modified in a different structure. It is to be understood, therefore, that within the scope of the appended claims, the invention may be practiced otherwise than as specifically described herein.

What is claimed is:

1. In a final drive and differential unit for a motor vehicle comprising a differential carrier integrally formed with a cylindrical support structure and arranged to store an amount of lubricating oil therein, a differential gear unit rotatably mounted within said carrier, a ring gear contained within said carrier and mounted on said differential gear unit for rotation therewith, and a drive pinion shaft supported by a pair of axially spaced outside and inside bearings mounted within said cylindrical support structure, said drive pinion shaft extending outwardly through an annular oil seal member mounted within an outer end portion of said cylindrical support structure and having an inner end integral with a drive pinion in mesh with said ring gear, wherein said cylindrical support structure has first and second side walls located at respective sides of said pinion shaft, said first side wall being formed therein with an oil supply passage having one end in open communication with the interior of said carrier for receiving lubricating oil picked up by said ring gear and another end in open communication with an annular space around said drive pinion shaft between said oil seal member and said outside bearing, and said second side wall being formed therein with an oil return passage having one end in open communication with the interior of said carrier and another end in open communication with the annular space around said drive pinion shaft, the improvement wherein said cylindrical support structure is formed at an inner wall thereof with a recessed portion which is located above the annular space around said drive pinion shaft and includes a guide surface inclined with respect to said drive opinion shaft and directed toward an upper portion of said oil seal member, and wherein an impeller member is mounted on said drive pinion shaft for rotation therewith and arranged to pick up lubricating oil stored in the annular space around said drive pinion shaft and carry it toward the recessed portion in said cylindrical support structure.

2. A final drive and differential unit as claimed in claim 1, wherein said impeller member is in the form of a screw washer mounted on said drive pinion shaft and fixed in place by engagement with an inner race of said outside bearing.

3. A final drive and differential unit as claimed in claim 2, wherein said screw washer is integrally formed with a plurality of circumferentially spaced radial blades.

4. A final drive and differential unit as claimed in claim 1, wherein the recesser portion in said cylindrical support structure includes a circumferential guide surface formed above the annular space around said drive pinion shaft to cause circumferentially upward flow of lubricating oil picked up by said impeller member, a vertical guide surface formed along an upper end of said circumferential guide surface to receive the lubricating oil, and the inclined guide surface directed toward an upper portion of said oil seal member to transfer the lubricating oil onto said oil seal member.

5. A final drive and differential unit as claimed in claim 1, wherein a companion flange is mounted on an outer end portion of said drive pinion shaft and has a sleeve portion surrounded by said oil seal member to close the interior of said cylindrical support structure in a fluid-tight manner, and wherein said impeller member is in the form of a screw washer interposed between the sleeve portion of said companion flange and an inner race of said outside bearing to position said companion flange in place on said drive pinion shaft.

* * * * *